(12) United States Patent
Deane

(10) Patent No.: US 6,912,037 B2
(45) Date of Patent: Jun. 28, 2005

(54) HIGHER AND LOWER DEFINITION PATTERNING OF AN ACTIVE PLATE

(75) Inventor: Steven C. Deane, Redhill (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 26 days.

(21) Appl. No.: 10/151,085

(22) Filed: May 20, 2002

(65) Prior Publication Data

US 2002/0176031 A1 Nov. 28, 2002

(30) Foreign Application Priority Data

May 23, 2001 (GB) .............................................. 0112563

(51) Int. Cl.[7] .......................................... G02F 1/1343
(52) U.S. Cl. .......................... 349/187; 349/39; 349/46
(58) Field of Search ........................... 349/39, 46, 141, 349/187

(56) References Cited

U.S. PATENT DOCUMENTS

| | | | | |
|---|---|---|---|---|
| 4,783,147 A | * | 11/1988 | Maurice et al. ............... 349/43 |
| 5,097,297 A | * | 3/1992 | Nakazawa ................... 257/347 |
| 5,299,041 A | * | 3/1994 | Morin et al. .................. 349/42 |
| 5,394,258 A | * | 2/1995 | Morin et al. .................. 349/38 |
| 5,822,027 A | * | 10/1998 | Shimada et al. ............. 349/39 |
| 5,905,556 A | * | 5/1999 | Suzuki et al. ............... 349/141 |
| 5,946,065 A | | 8/1999 | Tagusa et al. ............... 349/138 |
| 6,040,813 A | * | 3/2000 | Takubo ........................ 345/92 |
| 6,052,162 A | | 4/2000 | Shimada et al. ............. 349/38 |
| 6,175,393 B1 | * | 1/2001 | Ban et al. ..................... 349/39 |
| 6,686,229 B2 | * | 2/2004 | Deane et al. ................ 438/151 |

FOREIGN PATENT DOCUMENTS

EP 0514029 A2 11/1992 ........... G02F/1/136

* cited by examiner

Primary Examiner—Andrew Schechter

(57) ABSTRACT

The storage capacitor of an active matrix liquid crystal display is formed to have a second electrode (28) that laterally overlaps a first electrode (10). The drain (30) of a thin film transistor extends across the gate electrode (2). The gate electrode (2) and the first electrode (10) of the storage capacitor are formed from a single metallization layer. The width of the gate electrode (2) and the first electrode (10) will tend to vary in parallel, as a result of process variation. This parallel variation tends to cancel out subsequent variation in the kick back voltage.

18 Claims, 4 Drawing Sheets

HIGHER AND LOWER DEFINITION PATTERNING OF AN ACTIVE PLATE

The application relates to an active plate including a storage capacitor and to a method of making the active plate, and in particular to a storage capacitor, pixel structure and method for making an active plate as used for example in an active matrix liquid crystal display.

Active matrix liquid crystal displays (AMLCDs) are widely used for providing high quality displays in a number of applications, for example laptop personal computers. In such active matrix liquid crystal displays, transistors corresponding to individual pixel electrodes are used to drive the liquid crystal display. The transistors are generally thin film transistors (TFTs).

Conventionally, active matrix liquid crystal displays include an active plate carrying the active pixel electrodes and corresponding TFT drive transistors and an opposed passive plate supporting a counter electrode, with liquid crystal sandwiched between the active and passive plates.

A conventional active plate of an AMLCD is illustrated in top view in FIG. 1 and in section along A—A in FIG. 2. The active plate is formed on a substantially flat substrate 1. Row electrodes 2 and column electrodes 4 extend across the active plate in substantially perpendicular directions. Gate electrodes 6 extend off the row electrodes 2 to form the bottom gate of each pixel element. Insulating regions 8 separate the row and column electrodes. Capacitor electrodes 10 likewise extend across the active matrix, parallel to the row electrodes.

An insulating layer 16 is formed over the gate electrode to form the gate insulating layer and over the capacitor electrode to form the capacitor dielectric. A semiconductor region 12 is formed over the insulating layer 16. The semiconductor region includes a lower undoped amorphous silicon layer 14 extending from a source region 34 to a drain region 36 over the gate insulating layer 16 and highly doped contact regions 18 at the source and drain regions 34,36. A source contact 32 connects to the source region 34 and a drain contact 30 connects to the drain region 36. A spur 24 extends from the column electrode 4 to connect to the source contact 32.

The semiconductor region 12, gate electrode 6, insulating layer 16 and source and drain contacts 18 form a thin film transistor (TFT) structure.

The TFT structure is covered by an insulating layer 20. A via hole 22 connects through this insulating layer to the drain contact 30. A transparent pixel electrode 26, generally formed of indium tin oxide, connects to the drain contact 30 through the via hole 22.

A storage capacitor is formed between the pixel electrode 26 and the capacitance line 10. To this end, a top capacitor electrode 28 is formed in each pixel above the insulating layer 16 over the storage capacitor electrode 10. The pixel electrode 26 connects to the top capacitor electrode 28 through a via hole 22.

The single pixel electrode and TFT structure described above is repeated across the substrate 1 to define a matrix of pixels.

Typical processes for making arrays of pixel electrodes to form active plates use photolithography and etching to pattern the various layers used to make up the structure. Many processes employ five mask layers, although some processes have been proposed using only four mask layers. The need to deposit material layers, define photoresist on each layer and then etch or develop away as much as 95% of each material layer limits possible cost savings.

Moreover, photolithography is a high cost process which uses tools with a high capital cost, limited throughput and which consumes large quantities of costly photoresist and developer.

Accordingly, there have been proposals to use lower cost lower resolution patterning processes to fabricate active matrix plates. For example, printing processes have been proposed. Unfortunately, printing processes have poor resolution and alignment accuracy compared with conventional photolithography. Moreover, printing processes such as gravure offset tend to leave hairs or tails on materials extending out from the trailing edges of features. These hairs or tails can cause short circuits. Accordingly, it is very difficult to manufacture active plates using printing technologies.

There is thus a need for a method of manufacturing active plates using lower resolution processes, and for corresponding active plate designs.

According to the invention, there is provided an active plate, comprising: a substrate; a first metallisation layer defining gate electrodes and further defining first storage capacitor electrodes extending longitudinally across the substrate; a second metallisation layer defining source and drain electrodes and second storage capacitor electrodes; a semiconductor body layer forming thin film transistor bodies between the source and drain electrodes; and an insulation layer between first and second storage capacitor electrodes, wherein the drain electrode extends across the width of the gate electrode, and the second storage capacitor electrode overlaps the lateral edges of the first storage capacitor electrode.

Thus, the second capacitor electrode extends across the first capacitor electrode and the drain electrode extends across the gate electrode.

Normally, process variation of the line width of any particular layer will vary gradually across the substrate, Therefore, the gate electrode line width and the first storage capacitor electrode line width will tend to vary together, since both are formed in the same first metallisation layer. Because the drain electrode extends across the width of the gate and the second storage capacitor electrode extends across the first capacitor electrode, the storage capacitance will tend to vary in parallel with the gate-drain capacitance. Accordingly, the kick back voltage which is the ratio of these two quantities will be much less dependent on variability in the patterning process used to define the first metallisation layer of the gate electrode and the first capacitor electrode.

The second storage capacitor electrode may be formed from a plurality of elements having a width within a factor of 2 of the width of the drain electrode. This may allow a reduction in the sensitivity of the kick-back voltage to variation in the width of the second metallisation layer. The plurality of elements may extend in a direction substantially normal to the first storage capacitor electrode.

In embodiments, the second storage capacitor may be formed from a plurality of elements extending laterally across the width of the first capacitor electrode and connected together by at least one element extending longitudinally. This structure reduces the sensitivity of the kick-back voltage to variations in the widths either of the first or the second metallisation layer.

The active plate may incorporate features to permit one or more layers to be formed from a lower definition patterning process. For example, the semiconductor body may extend longitudinally over the gate electrode, so that any hairs or tails extending from the semiconductor body will remain over the gate electrode without significantly affecting the structure by creating short circuits.

The gate electrodes may extend longitudinally across the substrate. They may have substantially constant width. These features facilitate the use of a lower definition patterning process for the gate electrode layer.

The active plate may be incorporated in a liquid crystal display having liquid crystal arranged between active and passive plates.

The invention also relates to a method of manufacture of an active plate, comprising the steps of: depositing and patterning using a lower definition patterning process a first metallisation layer on a substrate, the first metallisation layer defining gate electrodes and first storage capacitor electrodes extending longitudinally across the substrate; depositing an insulation layer; depositing and patterning using a lower definition patterning process a semiconductor body layer forming thin film transistor bodies; and depositing and patterning using a higher definition process a second metallisation layer defining source and drain electrodes and second storage capacitor electrodes, wherein the second storage capacitor electrodes overlap the lateral edges of the first storage capacitor electrode.

The overlapping second storage capacitor electrode reduces adverse effects from the use of lower definition processes used to pattern some of the layers, especially the first metallisation layer. In particular, the device thus manufactured may exhibit a lower variation in kick back voltage than would otherwise be the case.

In embodiments, the higher definition process may be photolithography and the lower definition process may be printing.

The drain electrode may extend across the width of the gate electrode.

This structure is suitable in any application where it is desired that the storage capacitance tends to follow any variation in capacitance between two electrodes of a TFT.

Specific embodiments of the invention will now be described, purely by way of example, with reference to the accompanying drawings, in which.

It should be noted that all of the Figures are purely schematic and in particular not to scale.

Figure 1:
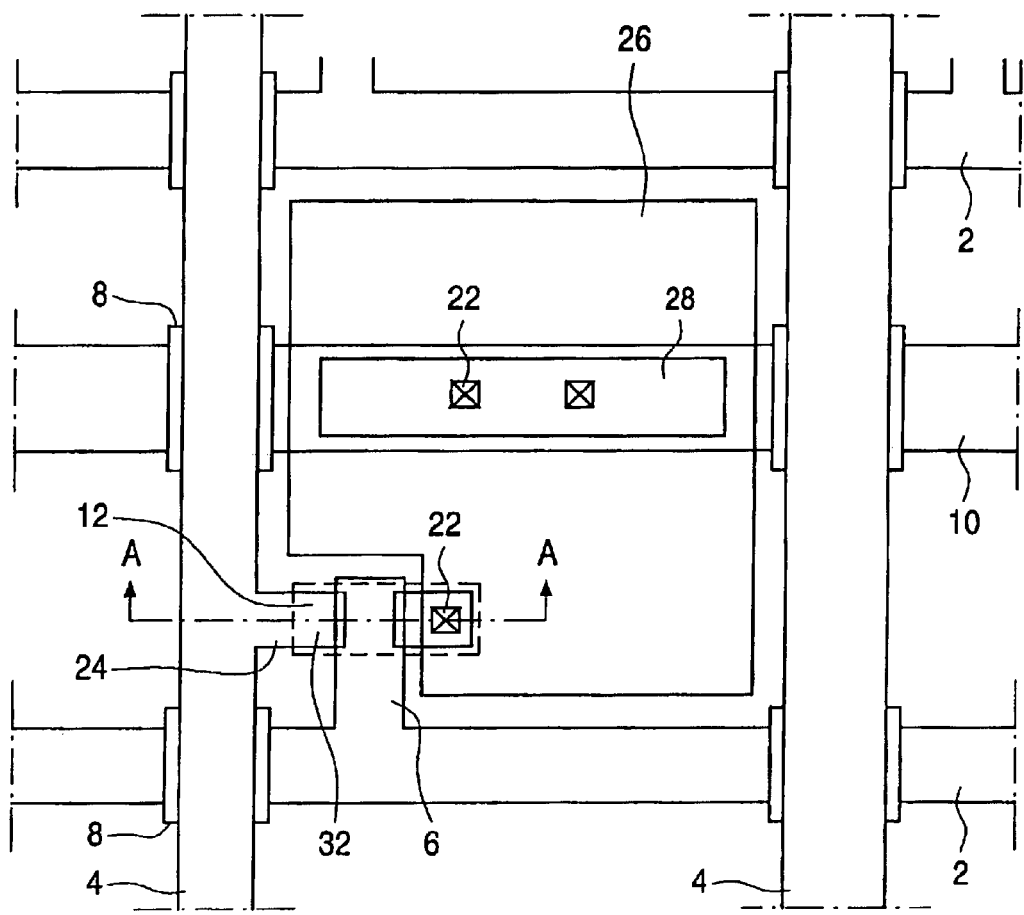
FIG. 1 is a top view of a conventional active matrix liquid crystal display.
Figure 2:
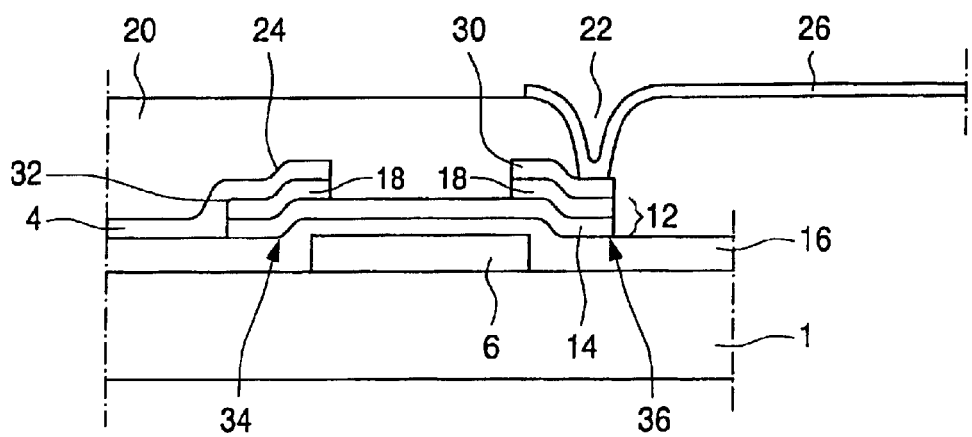
FIG. 2 shows a section through the thin film transistor in the arrangement of FIG. 1.
Figure 3A:
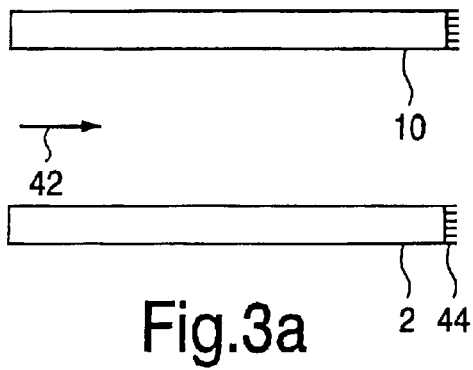
FIGS. 3a to 3e illustrate in top view the manufacturing steps for making an active plate according to an embodiment of the invention.
Figure 3B:
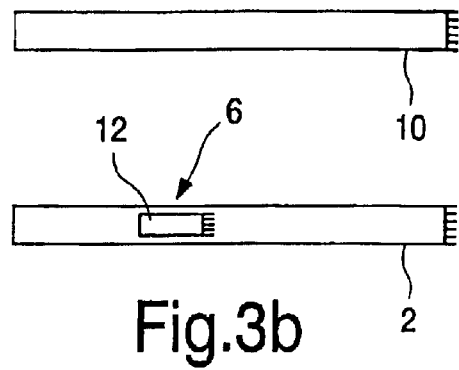
Figure 3C:
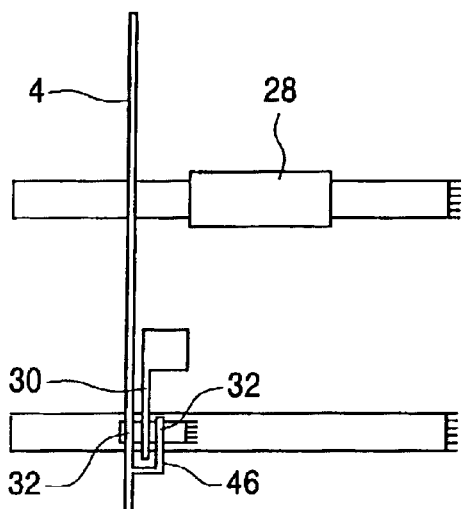
Figure 3D:
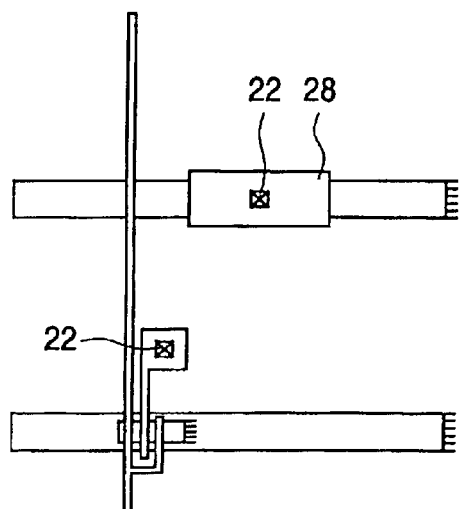
Figure 3E:
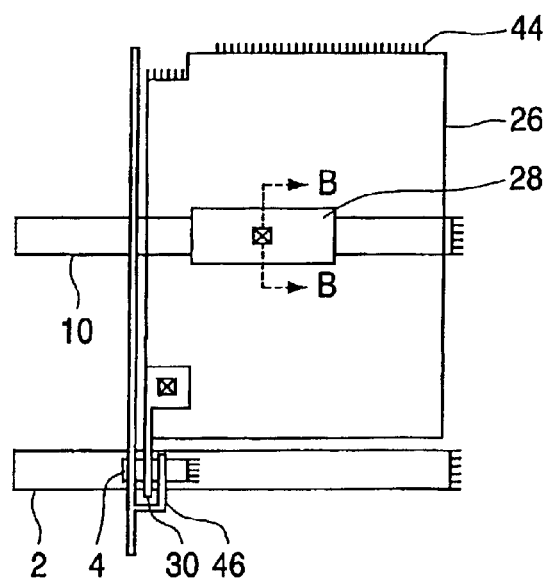
Figure 4:
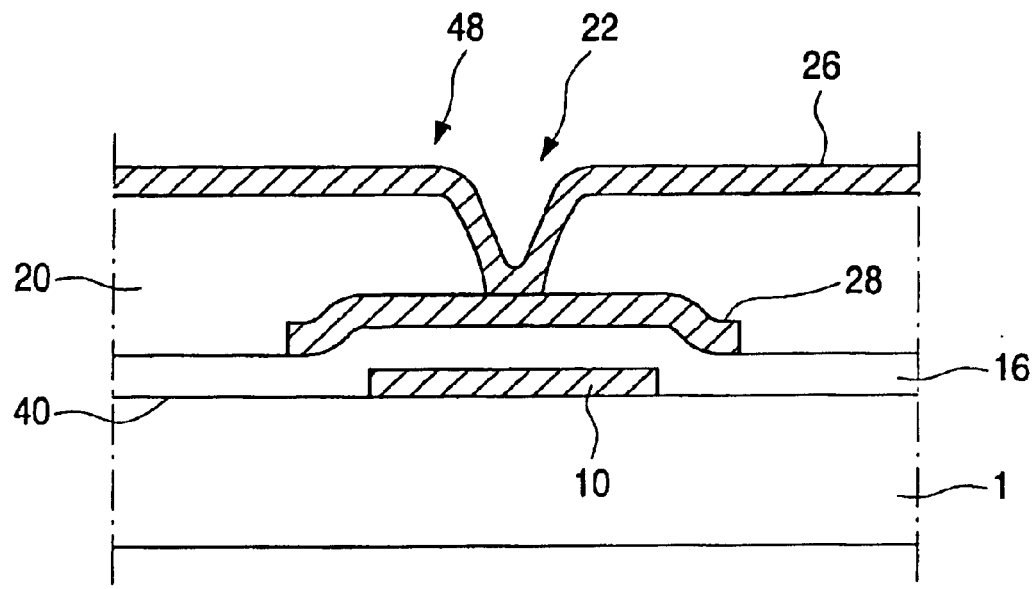
FIG. 4 is a side section along B—B of the active plate shown in FIG. 3e.

FIG. 3 illustrates, in top schematic view, the steps of an exemplary method of manufacturing a thin-film device according to the invention, and FIG. 4 illustrates the thin film device thus made, in section through B—B. In the example, the device is an active plate of an active matrix liquid crystal display.

The method of manufacturing an active plate according to the exemplary embodiment begins with a substrate 1. The substrate is made of a transparent material, such as glass, with an upper surface 40, which may, as shown, be substantially flat.

A first metallisation layer 2,10 is printed on the surface 40 of the substrate 1. The metallisation layer 2,10 defines a plurality of row electrodes 2 that extend across the substrate, and a plurality of storage capacitor lines 10 that likewise extend across the substrate parallel to the row electrodes 2. For clarity, only one row electrode 2 and one storage capacitor line 10 are shown in FIG. 3 but it will be appreciated that a number of row electrodes 2 and storage capacitor lines 10 may be provided to make an array.

The first metallisation layer 2,10 is printed in a single offset printing operation that prints across the substrate in a row direction 42 parallel to the row electrodes 2. Both the row 2 and capacitance 10 electrodes are of substantially constant width in the area of the array used for the display. Any tails 44 which occur at the end of the row 2 and capacitance 10 electrodes occur outside the area of the display and accordingly have little effect.

A gate dielectric layer 16 of silicon nitride is then formed over the whole of the substrate 1.

Next, semiconductor islands 12 are formed. These are formed by depositing a layer of intrinsic amorphous silicon 14 (i a-Si:H) and then a layer of doped amorphous silicon 18 (n+ a-Si:H). Each layer is printed using a mask of the same form. The semiconductor islands 12 are arranged longitudinally over the row electrodes and are rectangular in form, with the long sides of the rectangles 12 parallel to the row electrodes 2, i.e. along the row direction 42. The printing is carried out in the row direction 42. The regions 6 of the row electrodes 2 under the semiconductor islands 12 act as gate electrodes.

The next step is to provide a second metallisation layer 4,28,30,46. This is deposited over the whole substrate and then patterned using conventional photolithography. The metallisation layer forms column electrodes 4 which extend across the substrate in a direction perpendicular to the row electrodes 2 and parts of which constitute source contacts 32. Fingers 46 extend from the column electrodes round the drain electrode to form a further source contact 32. The second metallisation layer also forms a drain electrode 30. The column electrodes 4, the fingers 46 and the drain electrode 30 extend across the semiconductor island 12 perpendicularly to the row direction 42.

The second metallisation layer 4,28,30,46 is also used to form the top electrodes 28 of the storage capacitors 48. The shape of the top electrodes will be discussed later. The insulating layer 16 acts as the capacitor dielectric between the top electrodes 28 and the storage capacitor lines 10.

The second metallisation layer 4,28,30,46 is then used as an etch mask to carry out a back-channel etching step to etch away the doped amorphous silicon layer 18 except under the second metallisation layer 4,30, 46. This leaves the intrinsic amorphous silicon layer 14 over the row electrodes 2 to form the channels of thin film transistors. The regions 6 of the row electrodes 2 under the semiconductor island form the gates of the thin film transistors.

In this way the channel length of the thin film transistors is defined by the higher definition patterning method of photolithography instead of the lower definition method of printing. The arrangement of layers, and especially the simple form of the semiconductor island and row electrodes, means that inaccuracies in the definition of the semiconductor island and row electrodes is less critical than with conventional array structures.

A passivation layer 20 is then formed over the whole of the substrate. The passivation layer may be patterned by a lower definition method, such as printing. A contact hole mask is then printed and used to etch vias 22 above the top electrode 28 of the capacitor and the drain 30. The passivation layer 20 is of silicon nitride. Other materials may be used, such as polymer material. The contact hole mask is then removed, as is known.

Pixel electrodes 26 of Indium tin oxide (ITO) are then printed over the passivation layer 20 to complete the active plate. The printing direction is perpendicular to the row direction 42. The gap between the pixel electrode 26 and adjacent row electrodes 2 is sufficient that trailing hairs 44 from the pixel electrodes do not overlap the adjacent row electrodes 2.

The pixel electrode contacts the drain 30 and the top capacitor electrode 28 through the via holes 22.

As will be noted, the top electrode 28 overlaps the lateral edges of the lower storage capacitor electrode 10. In this way, if the width of the row electrode 2 and the capacitor electrode 10 is a little larger or smaller than the nominal, designed value, the capacitance of the storage capacitor will increase, but so will the gate-drain capacitance of the TFT.

The kick-back voltage is proportional to the product of the change in gate voltage at the end of the addressing pulse and the ratio of the gate-drain capacitance to the total pixel capacitance, i.e. the storage capacitance plus the liquid crystal capacitance between active and passive plates plus the gate-drain capacitance. The kickback voltage thus depends on the ratio of the gate-drain capacitance and the storage capacitance and the pixel capacitance. Since these capacitances tend to vary in corresponding ways, their ratio and hence the kick-back voltage varies much less with process variation than in prior arrangements.

The approach described is a development of the approach described in copending patent application GB0105145.7 to Philips (our ref PHGB010030), which is incorporated herein by reference. In the approach of the copending application, a five layer patterning process is used to define the layers of an active plate. The design of the layers is different to that conventionally used in order that it is only necessary to pattern one layer, the layer used for the source and drain metallisations, using a high accuracy process such as photolithography. The other layers can be patterned using a low definition process, for example printing.

It should be noted that the reduction in variation of the kick-back voltage is not dependent on the particular form of the gate electrode 6. For example, the invention may also be used in arrangements where the gate electrode 6 is in the form of a spur extending laterally from row electrodes 2, as long as the drain extends across the width of the gate electrode.

Nevertheless, the use of a row electrode 2 as the gate electrode 6 with a semiconductor body 12, thereon does permit the structure to be manufactured more easily using lower definition patterning process.

FIG. 5 illustrates a number of possible shapes of the second electrode 28 of the storage capacitor. In the embodiments described the second metallisation layer 4, 28, 30, 46 defining the drain electrode 30 and patterned to provide the second storage capacitor electrode 28 having a plurality of fingers 50 is provided above the first metallisation layer 2,10. However, the invention is also applicable in arrangements where the second metallisation layer 4, 28, 30,46 is provided under the first metallisation layer 2,10.

Figures 5A, 5B, 5C, 5D:
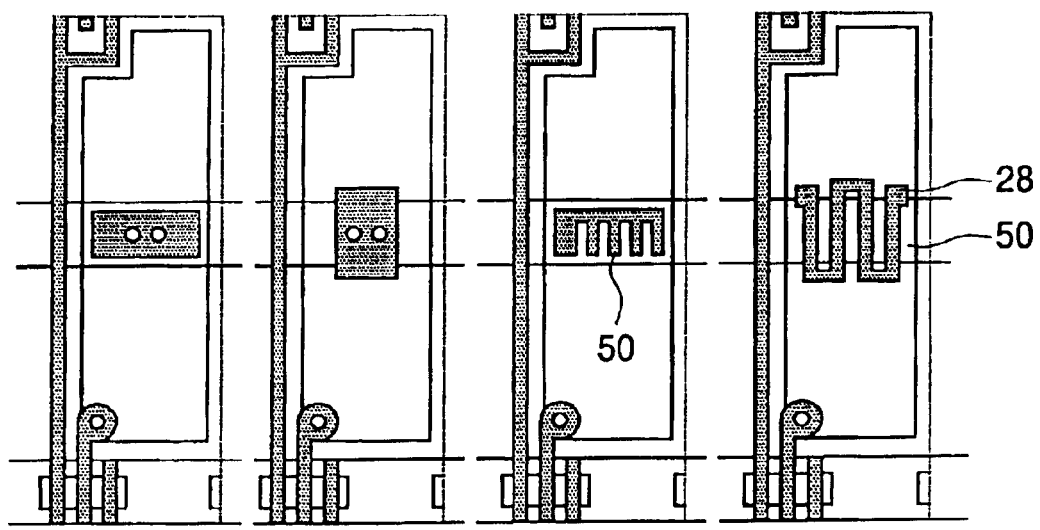
FIGS. 5a to 5d are detailed views of the form of a capacitor electrode in embodiments of the invention and in comparative examples.

FIG. 5a illustrates the arrangement described in the previously mentioned co-pending application, in which the second electrode 28 is wholly above and within the area of the first storage capacitor electrode 10.

In the comparative example of FIG. 5b, in contrast, the second capacitor 28 overlaps the edges of the lower capacitor electrode 10. In this way, when the top storage capacitor electrode 28 is broader than nominal, as a result of process variation, the width of the gate electrode tends to be likewise broader. Thus, the capacitance of the storage capacitor 48 and the parasitic gate drain capacitance of the TFT vary in parallel, and any variation in the kickback voltage is reduced. Calculations have shown that the design using this capacitor has only 40% of the sensitivity to variations in the metallisation layer width of the gate electrode 2 and the lower capacitor electrode 10 compared with that shown in FIG. 5a.

The design shown in FIG. 5c, in accordance with the invention, has less sensitivity to variation in the width of the second metallisation layer 4,28,30,46 that forms the column electrodes 4, the drain electrode 30 and the second electrode 28 of the storage capacitor 48. Variation in the width of the drain electrode 30 is matched in the second storage electrode 28 of the gate capacitor, so the gate-drain and storage capacitances tend to vary in parallel. Modelling suggests that this arrangement can very substantially reduce the sensitivity of the kickback voltage to variations in the width of the features in the second metallisation layer 4,28,30,46.

FIG. 5d illustrates an arrangement in accordance with the invention which combines both of the benefits of FIG. 5b and c. In this case, the storage capacitor 48 design reduces the effect of variation in the width of both the first 2,10 and second 4,28,30,46 metallisation layers.

It is not essential that the fingers 50 in the second metallisation layer 4,28,30,46 across the storage capacitor are connected together by longitudinal elements 52; any suitable electrical connection may be used. For example, the connection may be through separate vias 22 corresponding to each finger. The vias 22 may connect to a conductor in another layer, conveniently the pixel electrode 26.

Figure 6:
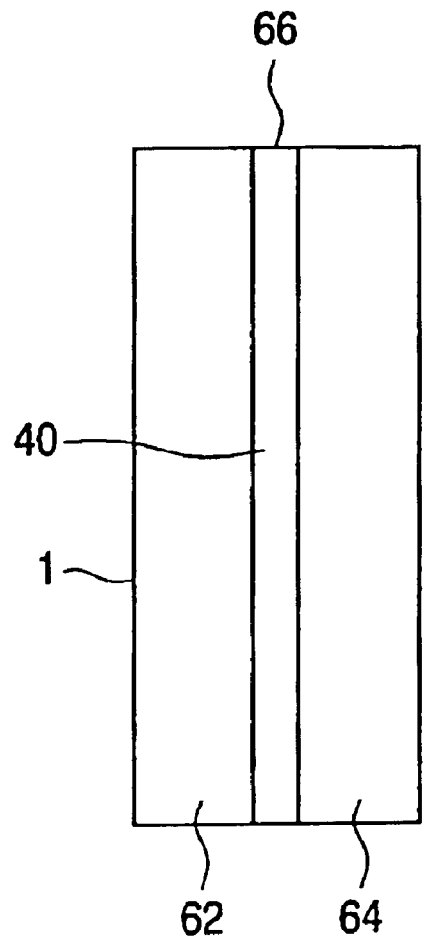
FIG. 6 is a schematic side section of a liquid crystal device according to the invention.

FIG. 6 illustrates a schematic section through a liquid crystal display having an active plate 62, a passive plate 64 and liquid crystal 66 between the active and passive plates. The skilled person will be familiar with the manufacture of liquid crystal display devices from active plates in this way.

The invention is not limited to the arrangements shown. In particular, although the invention has been described with a particular form of thin film transistor and capacitor, the invention is applicable to other forms of active plates having a storage capacitor and thin film transistors. One example application where the approach of the invention may be suitable is in the manufacture of large image sensors, e.g. industrial X-ray detectors, which may have TFTs integrated with storage capacitors, Further modifications may be made to the details of the embodiments described. For example, the substrate may be opaque and the plate may operate on reflective light. In this case, the pixel electrode need not be transparent.

In a further modification, some or all of the layers may be formed by covering the substrate with the material of the layer, printing a resist pattern onto the material and etching away the material where not required to pattern the layer. The use of printed resist avoids the need to process photoresist with photolithography techniques. In this way a lower cost printing technique may be used for patterning without needing to directly print the layer used.

The invention is not restricted to the manufacture of bottom-gated structures such as that described above, but is also applicable to the manufacture of top-gated structures. As the skilled person will appreciate, the order of the layers will determine the order of the manufacturing steps. For example, for a bottom gated structure the row electrodes forming the gate may be deposited and patterned followed by the gate insulation layer followed by the semiconductor regions and then the source and drain metallisations.

Conversely, in order to form a top-gated structure the row electrodes defining the gate may be defined after the source and drain metallisations, the semiconductor layer and gate insulator are deposited.

The described embodiment uses photolithography as the higher resolution process and printing as the lower resolution process. However, the invention is also applicable to other sets of processes. For example, the lower resolution process used for most of the layers may be a lower resolution photolithography process for example using a contact aligner, and for the higher resolution process a projection aligner may be used. Alternatively, a contact aligner may be used as the higher resolution process, with printing used as the lower resolution process.

Furthermore, it is not necessary to limit the number of processes to two. For example, it may be convenient to pattern one layer using one lower definition process and another layer using a different lower definition process.

The invention may also be applied with a variety of semiconductor technologies. The amorphous silicon layer described may be replaced by any of a number of semiconductor types. Examples include polysilicon, organic semiconductors, II–VI semiconductors such as CdTe, II–V semiconductors such as GaAs, and others.

The metallisation layers may be of aluminium, copper, or any convenient conductor, not necessarily metal.

From reading the present disclosure, other variations and modifications will be apparent to persons skilled in the art. Such variations and modifications may involve equivalent and other features which are already known in the design, manufacture and use of electronic devices comprising thin-film circuits, semiconductor devices, and component parts thereof, and which may be used instead of or in addition to features already described herein.

Although claims have been formulated in this Application to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. Features which are described in the context of separate embodiments may also be provided in combination in a single embodiment. Conversely, various features which are, for brevity, described in the context of a single embodiment, may also be provided separately or in any suitable subcombination. The Applicants hereby give notice that new claims may be formulated to such features and/or combinations of such features during the prosecution of the present Application or of any further Application derived therefrom.

What is claimed is:

1. An active plate comprising:
   a substrate;
   a first metallization layer defining gate electrodes and further defining first storage capacitor electrodes extending longitudinally across the substrate, thereby forming corresponding lateral edges of the first storage capacitor electrodes;
   a second metallization layer defining source and drain electrodes and second storage capacitor electrodes;
   a semiconductor body layer forming thin film transistor bodies between the source and drain electrodes; and
   an insulation layer between first and second storage capacitor electrodes,
   thereby forming a plurality of pixel elements, each pixel element having a corresponding source, drain, and gate electrode, and a corresponding first and second storage capacitor electrode;
   wherein
   the drain electrode extends completely across at least one dimension of the gate electrode, and the second storage capacitor electrode overlaps the lateral edges of the first storage capacitor electrode, and
   the second storage capacitor electrode includes a plurality of elements having a width within a factor of 2 of a width of the drain electrode.

2. The active plate of claim 1 wherein the plurality of elements extend laterally across the first storage capacitor electrode.

3. The active plate of claim 2 wherein the second storage capacitor electrode includes a plurality of elements extending laterally across a width of the first capacitor electrode and connected together by at least one longitudinal element.

4. A method of manufacture of an active plate, comprising:
   depositing and patterning using a lower definition patterning process a first metallization layer on a substrate, the first metallization layer defining gate electrodes and first storage capacitor electrodes extending longitudinally across the substrate, and having corresponding lateral edges extending longitudinally across the substrate;
   depositing an insulation layer;
   depositing and patterning using a lower definition patterning process a semiconductor body layer forming thin film transistor bodies; and
   depositing and patterning using a higher definition process a second metallization layer defining source and drain electrodes and second storage capacitor electrodes,
   such that the second storage capacitor electrodes overlap the lateral edges of the first storage capacitor electrode.

5. The method of claim 4 performed such that
   the drain electrode extends across at least one dimension of the gate electrode.

6. The method of claim 4 performed such that
   the higher definition process is photolithography and the lower definition process is printing.

7. A method of manufacture or an active plate, comprising:
   depositing and patterning a first metallization layer on a substrate using a lower definition patterning process, the first metallization layer defining gate electrodes and first storage capacitor electrodes extending longitudinally across the substrate, and having corresponding lateral edges extending longitudinally across the substrate;
   depositing an insulation layer;
   depositing and patterning a semiconductor body layer forming thin film transistor bodies; and
   depositing and patterning a second metallization layer defining source and drain electrodes and second storage capacitor electrodes using a higher definition patterning process,
   such that the second storage capacitor electrodes overlap the lateral edges of the first storage capacitor electrode.

8. The method of claim 7, performed such that
   the drain electrode extends across at least one dimension of the gate electrode.

9. The method of claim 7, performed such that
   the higher definition process is photolithography and
   the lower definition process for depositing and patterning the first metallization process includes printing.

10. The method of claim 7, performed such that the lower definition process for depositing and patterning the semiconductor body layer includes printing.

11. An active plate, comprising:

a substrate;

a first metallization layer defining gate electrodes and further defining first storage capacitor electrodes extending longitudinally across the substrate, thereby forming corresponding lateral edges of the first storage capacitor electrodes;

a second metallization layer defining source and drain electrodes and second storage capacitor electrodes;

a semiconductor body layer forming thin film transistor bodies between the source and drain electrodes; and an insulation layer between first and second storage capacitor electrodes, such that the first and second metallization layers, the semiconductor body, and the insulation layer are arranged to form a plurality of pixel elements, each pixel element having a corresponding source, drain, and gate electrode, and a corresponding first and second storage capacitor electrode;

wherein thin first metallization layer exhibits a first variance of width longitudinally across the substrate that is substantially greater than a second variance of width of the second metallization layer longitudinally across the substrate, and the drain electrode extends completely across at least one dimension of the gate electrode, and the second storage capacitor electrode overlaps the lateral edges of the first storage capacitor electrode.

12. The active plate of claim 11, wherein a width of the gate electrode corresponding to the at least one dimension is from 0.8 to 1.2 times a width of the first storage capacitor electrode.

13. The active plate of claim 11, wherein the semiconductor body extends longitudinally over the gate electrode.

14. A liquid crystal display comprising:

an active plate, a passive plate and liquid crystal between the active and passive plates, the active plate comprising:

a substrate;

a first metallization layer defining gate electrodes and further defining first storage capacitor electrodes extending longitudinally across the substrate;

a second metallization layer defining source and drain electrodes and second storage capacitor electrodes;

a semiconductor body layer forming thin film transistor bodies between the source and drain electrodes; and an insulation layer between first and second storage capacitor electrodes, wherein the first metallization layer exhibits a first variance of width longitudinally across the substrate that is substantially greater than a second variance of width of the second metallization layer longitudinally across the substrate, and each drain electrode extends completely across at least one dimension of each gate electrode, and each second storage capacitor electrode overlaps the lateral edges of each first storage capacitor electrode.

15. An active plate produced by depositing and patterning a first metallization layer on a substrate using a lower definition patterning process.

the first metallization layer defining gate electrodes and first storage capacitor electrodes extending longitudinally across the substrate, and having corresponding lateral edges extending longitudinally across the substrate;

depositing an insulation layer;

depositing and patterning a semiconductor body layer forming thin film transistor bodies; and depositing and patterning a second metallization layer defining source and drain electrodes and second storage capacitor electrodes using a higher definition patterning process, so that a variance of a width of the second metallization layer longitudinally across the surface is substantially less than a variance of a width of the first metallization layer longitudinally across the surface, wherein the second storage capacitor electrodes overlap the lateral edges of the first storage capacitor electrode.

16. The active plate of claim 15, wherein the second storage capacitor electrode includes a plurality of elements having a width with in a factor of 2 of a width of the drain electrode.

17. The active plate of claim 15, wherein a width of the gate electrode is from 0.8 to 1.2 times a width of the first storage capacitor electrode.

18. The active plate of claim 15, wherein the semiconductor body extends longitudinally over the gate electrode.

* * * * *